United States Patent [19]

Muraldihara et al.

[11] Patent Number: 5,252,218
[45] Date of Patent: Oct. 12, 1993

[54] PROCESS FOR SEPARATING SOLID PARTICULATES FROM A NONAQUEOUS SUSPENSION

[75] Inventors: Harapanahalli S. Muraldihara, Plymouth; Aihua Song, New Hope, both of Minn.

[73] Assignee: Cargill, Incorporated, Minneapolis, Minn.

[21] Appl. No.: 892,218

[22] Filed: Jun. 2, 1992

[51] Int. Cl.⁵ .................................................. B01D 65/08
[52] U.S. Cl. ........................................ 210/636; 210/651; 210/321.69
[58] Field of Search ............... 210/411, 636, 651, 652, 210/500.26, 500.25, 321.69

[56] References Cited

U.S. PATENT DOCUMENTS

| | | | |
|---|---|---|---|
| 2,159,434 | 5/1939 | Frey | 196/94 |
| 2,780,617 | 2/1957 | Zletz | 260/88.1 |
| 2,947,687 | 8/1960 | Lee | 210/23 |
| 2,970,990 | 2/1961 | Cines | 260/94.9 |
| 3,056,772 | 10/1962 | Wallace | 260/94.9 |
| 3,720,645 | 3/1973 | Nistri et al. | 260/47 EP |
| 3,901,842 | 8/1975 | Dembowski | 260/29.6 RW |
| 4,107,026 | 8/1978 | Freeman | 204/300 R |
| 4,130,485 | 12/1978 | Dyer et al. | 210/805 X |
| 4,292,424 | 9/1981 | Huddleston, Jr. et al. | 528/500 |
| 4,331,525 | 5/1982 | Huba et al. | 204/181 F |
| 4,500,706 | 2/1985 | Mathis et al. | 528/502 |
| 4,562,021 | 12/1985 | Alary et al. | 264/43 |
| 4,603,109 | 7/1986 | Lillo | 435/41 |
| 4,661,634 | 4/1987 | Vaughn et al. | 564/292 |
| 4,693,800 | 9/1987 | Edwards et al. | 204/180.1 |
| 4,698,157 | 10/1987 | Gillot | 210/496 |
| 4,713,444 | 12/1987 | Matsuyama et al. | 528/502 |
| 4,724,078 | 2/1988 | Auriol et al. | 210/490 |
| 4,749,488 | 6/1988 | Arthur et al. | 210/490 |
| 4,816,140 | 3/1989 | Trambouze et al. | 208/309 |
| 4,826,607 | 5/1989 | Pearce | 210/770 |
| 4,859,324 | 8/1989 | Levy et al. | 210/195.2 |
| 4,883,078 | 5/1989 | Hsieh | 435/142 |
| 4,940,562 | 7/1990 | Watamabe et al. | 264/234 |
| 4,946,592 | 8/1990 | Galaj et al. | 210/490 |
| 4,980,066 | 12/1990 | Slegers | 210/636 |

*Primary Examiner*—Frank Spear
*Attorney, Agent, or Firm*—Fitch, Even, Tabin & Flannery

[57] ABSTRACT

A method for processing a flowable nonaqueous, high viscosity dispersion which includes a product, where the product is a particulate material having a particle size between about 1.0 microns to about 200 microns, is disclosed. The flowable dispersion has a viscosity from about 10 cps to about 500 cps at 140° F. The method comprises cross flow filtering the dispersion through a porous nonmetallic inorganic filter having a pore size from about 0.5 to about 10 microns. The cross flow rate is in the range of from about 3.0 to about 9.0 feet/second (1 to 3 ml/sec) at least about 120° F. and preferably there is at least one backflush at a rate of about 2 to about 5 seconds for every 3 to about 5 minutes of cross flow filtration.

11 Claims, 1 Drawing Sheet

PROCESS FOR SEPARATING SOLID PARTICULATES FROM A NONAQUEOUS SUSPENSION

This invention provides for the separation of insoluble solid particulate materials dispersed in a nonaqueous medium. More particularly, this invention is directed to the separation of insoluble particulate material in a dispersion where the particulate material in the dispersion includes particles having a cross section in the range of about one micron to about two hundred microns and where the solution polymer materials include alkyd, urethane and polyester polymers.

The manufacture of polymeric resins results in the polymerization of materials to varying molecular weights. These molecular weights largely depend on time and temperature polymerization conditions. After the polymerization reaction, these resins are in nonaqueous dispersions which dispersions will have particulate impurities which include, but are not limited to, polymeric product of varying molecular weights (approximately $1 \times 10^6$ Dalton). Generally, the higher the average molecular weight of the polymer, the larger the particulates will be for the polymer. More precisely, the reaction product of the polymerization reaction will have polymeric molecules of varying molecular weight and size, but the higher the number average molecular weight, the greater number of large molecules are in the distribution of polymers of varying molecular weights in the reaction product. The reaction product may have a significant amount of large insoluble particles resulting from over cooking in the polymerization reaction; or alternatively, large particles of polymeric material may be in the dispersion from high molecular weight material being made from random polymerization without running the reaction too long and/or at increased temperatures. However made, large polymeric particles and other particulate impurities should be removed from the reaction mixture to provide a uniform and pure product, especially for resins for polymeric vehicles and formulated coating compositions for paint coatings.

Current processes in resin production involve filtering the resin in a plate and frame filter with dead end pressure filtration. In this filtering process the dispersion is fed to the filter where the flow of feed is perpendicular to the surface of the filter. This filtering process involves mixing diatomaceous earth (DE) with the resin dispersed in a solvent such as xylene. This precoats the filter with DE. Such filtering, however, involves use of large amounts of organic solvents and volatile organic compounds (VOC) and generates large amounts of waste including diatomaceous earth permeated with resin and solvent. This waste creates disposal problems and increased costs. Moreover, disposal of the diatomaceous earth permeated with resin results in loss of resin with increased costs, as well as the aforedescribed environmental disposal problems.

It is an object of this invention to provide a process which eliminates the need for filter aids, such as diatomaceous earth, in the separation of insoluble solid particulates from other solution polymers present in the nonaqueous media.

It is another object of this invention to reduce or eliminate the generation of waste in the production and purification of polymeric resins.

It is yet another object of this invention to provide a process useful in the production and purification of polymeric resins which is economic and minimizes VOC emissions.

Still further objects and advantages of the invention will be found by reference to the following description.

SUMMARY OF THE INVENTION

Figure 1:
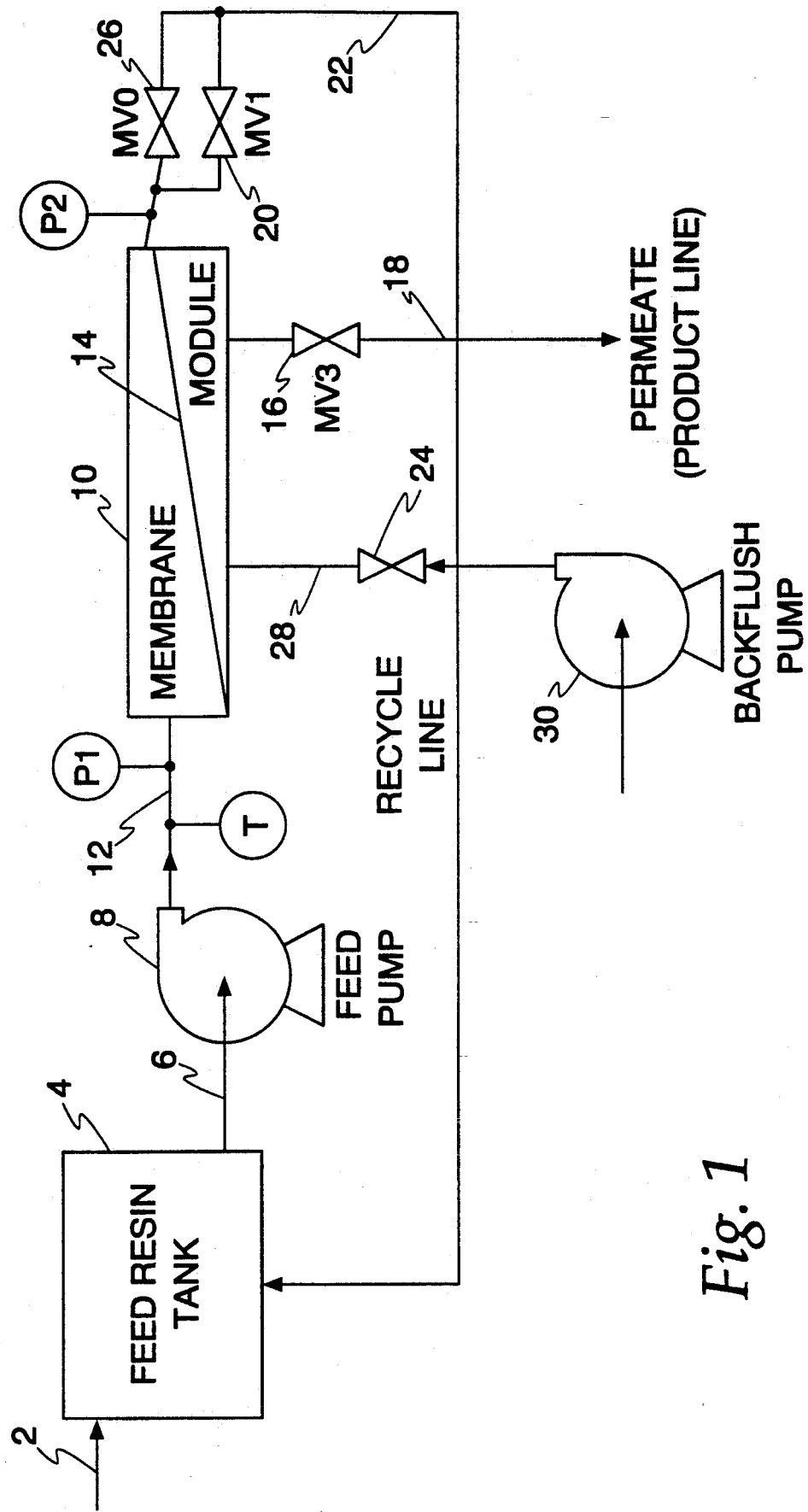
FIG. 1 is a schematic diagram of a separation system according to the invention.

According to the invention, a nonaqueous high viscosity dispersion comprising particles having a cross sectional size in the range of from about one micron to about two hundred microns is cross flow filtered through a nonmetallic inorganic filter having a pore size in the range of from about 0.5 to about 10 microns. In accordance with the invention particles in the dispersion are separated to remove undesired larger particles from the dispersion. The dispersion has a viscosity in the range of from about 10 cps to about 500 cps as measured by Brookfield Viscometer, Model RV, at a temperature of about 140° F. with the dispersion being cross flow filtered at a cross flow rate in the range of from about 3.0 to about 9.0 feet/second (about 1.0 to about 3.0 meters/sec).

In an important aspect of the invention, a nonaqueous dispersion of a particulate polymer selected from the group consisting of an alkyd polymer, a polyurethane polymer, a polyester polymer and mixtures thereof has particulate impurities removed therefrom where it is cross flow filtered according to the invention through a ceramic filter and at least about 95 weight percent of the polymer is passed through the filter in the filtrate to provide a purified solution polymer product. In a further aspect of processing the polymer dispersion, for every period of cross flow filtration in the range of from about 3 to about 5 minutes, the method of the invention includes at least about one back flush for a time in the range of about 2 to about 5 seconds. In still another important aspect of the invention directed to the separation of polymeric dispersions, the polymer is an alkyd polymer which after filtration has a number average molecular weight in the range of from about 1,500 to about 10,000 dissolved in a solvent selected from the group consisting of xylene, methyl isobutyl ketone, ethylene glycol monobutyl ether, ethyl 3-ethoxypropionate, Rule 66 exempt mineral spirits, propylene glycol monomethyl ether acetate, propylene glycol monomethyl ether, isobutyl alcohol, normal butyl alcohol, secondary butyl alcohol, normal butyl acetate, methyl amyl ketone, methyl isoamyl ketone, high flash aromatic naphtha, odorless mineral spirits, methyl propyl ketone, propylene glycol monobutyl ether, triethylamine, 2-ethyl hexyl acrylate, 1,6-hexanediol diacrylate, isobornyl acrylate and tripropylene glycol diacrylate.

DESCRIPTION OF THE PREFERRED EMBODIMENTS

As used in this Specification, "polymer" means a polymer with repeating monomeric units. "Polymeric vehicle" means all polymeric and resinous components in a formulated coating, i.e., before film formation. "Formulated coating" means the polymeric vehicle and solvents, pigments, catalysts and additives which may optionally be added to impart desirable application characteristics to the formulated coating and desirable properties such as opacity and color to the film. "VOC" means volatile organic compounds. "Volatile organic compounds" are defined by the U.S. Environmental Protection Agency (EPA) as any organic compound which participates in atmospheric photochemical reactions, except for specific designated compounds which have negligible photochemical activity. Water is not a VOC. The following compounds generally have been designated as VOCs. VOCs include, but are not limited to, myrcene, cumene, butyne, formaldehyde, carbon tetrachloride, aniline, dimethylnitrosamine, formic acid, acetone, chloroform, hexachloroethane, benzene, trichloroethane, methane, bromomethane, ethane, ethene, acetylene, chloromethane, iodomethane, dibromomethane, propane, 1-propyne, chloroethane, vinyl chloride, acetonitrile, acetaldehyde, methylene chloride, carbon disulfide, thiobismethane, bromoform, bromodichloromethane, 2-methylpropane, 1,1-dichloroethane, 1,1-dichloroethene, phosgene, chlorodifluoromethane, trichlorofluoromethane, dichlorodifluoromethane, tetrafluoromethane, tetramethylplumbane, 2,2-dimethylbutane, monomethylester-sulphuric acid, dimethylbutanone, pentachloroethane, trichloro-trifluroethane, dichlorotetrafluoroethane, hexachlorocyclopentadiene, dimethyl sulfate, tetraethylplumbane, 1,2-dibromopropane, 2-methylbutane, 2-methyl-1,3-butadiene, 1,2-dichloropropane, methyl ethyl ketone, 1,1,2-trichloro ethane, trichloroethene, 2,3-dimethylbutane, tetrachloroethane, dimethyl-3-methylene-bicyclo-heptane, A-pinene, hexachloro-butadiene, methylnaphthalene, naphthalene, quinoline, methylnaphthalene, phenylpropanone, dimethylbenzene, 0-cresol, chloro-methylbenzene, dichlorobenzene, trimethylbenzene, tetramethylbenzene, dibromo-3-chloropropane, 3-methylpentane, 3-pentanone, methylcyclopentane, (1-methylethyl)-benzene, 1-(methylethenyl)-benzene, 1-phenylethanone, nitrobenzene, methyl-methylethyl-benzene, ethylbenzene, ethenylbenzene, benzylchloride, benzonitrile, benzaldehyde, propylbenzene, butylbenzene, 1,4-diethylbenzene, 2,4-dimethylphenol, dimethylbenzene, chloro-methylbenzene, dichlorobenzene, dibromoethane, 3-bromo-1-propene, butane, 1-butene, 1,3-butadiene, 2-propanol, bromo-chloroethane, 1,2-dichloroethane, propanenitrile, 2-propenenitrile, 2-methylpentane, 2-pentanone, 2,4-dimethylpentane, 1,3-dimethylbenzene, m-cresol, 2,4-dimethylpyridine, 2,6-dimethylpyridine, trimethylbenzene, dimethylphenol, trichlorobenzene, trimethyl-pyridine, bromobenzene, methylcyclohexane, toluene, chlorobenzene, phenol, 2-methylpyridine, pentene, 1-pentane, bromo-chloro-propane, 1H-pyrrole, tetrahydrofuran, hexane, 1,4-dichlorobutane, cyclohexane, cyclohexene, pyridine, octane, 1-octene, nonane, dodecane, propene, 2-methyl-1-pentene, 2-methyl-1-propene, isoquinoline, trichlorobenzene, propanol, butanol, 1,4-(dioxane), 1-nonene, decane, dibromochloromethane, 2-chloro-butadiene, tetrachloroethene, dimethyl-methylene-bicyclo-heptane, 1,2-diethylbenzene, (1-methylpropyl)-benzene, acetic acid ethyl-ester, 1,3-diethylbenzene, cyclopentene, heptane, cis-dichloroethene, trans-dichloroethene, cyclopentane, cycloheptane, 1,2-propadiene, carbon oxide sulfide, 2,2,3-trimethylbutane, tetramethylbenzene, 2,4,5-trimethylphenol, 2-methyl-2-butene, tetramethylbenzene, 2,4,6-trimethylphenol, pentylbenzene, trimethyl-pentane, decamethylcyclo-pentasil-oxane, 1,3-dichlorobenzene, hexadecane, 2-methylthiophene, 3,3-dimethylpentane, 3-methyl-1-butene, 2-methyl-1-butene, 2,2,3-trimethyl-pentane, 2,3-dimethylpentane, 2,3,4-trimethylpentane, 2,6-dimethylphenol, 1,2,3-trimethylbenzene, 2,3-dimethylpyridine, 2,3-dimethylhexane, 3-chlorobenzaldehyde, 3-methylhexane, 2,4-dimethylhexane, 3-methylheptane, (Z)-2-butene, 2-methylhexane, trimethylbicyclo-heptane, (E)-2-heptene, 4-methylnonane, tetrachlorobenzene, butene, chloronitrobenzene, dichlorobenzene, dichloroethene, tetramethyl benzene, bromopropane, dichloro-1-propene, chlorobenzeneamine, dimethylcyclohexane, dichloronitrobenzene, dichloronaphthalene, dimethylcyclopentane, bromomethylbenzene, dichloromethyl-benzene, benzenedicarboxyl-dehyde, benzoyl nitro peroxide, bromochloropropane, dibromo-chloro-propane, pentachloro-butadiene, dibromochloropropane, 2-butoxyethanol, bromopentachloro ethane, tetradecamethyl-cycloheptasiloxane, trimethyl-pentanediol, dodecamethylcyclo-hexasil-oxane, hexamethylcyclotri-siloxane, octamethylcyclo-tetrasil-oxane, hexadecamethylcyclo-octasil-oxane, tridecane, tetradecane.

"Acrylic polymer" means a polymer or copolymers of

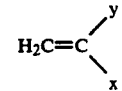

wherein
y=CH₃ or H
x=

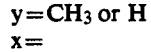

C₆H₅—or tolyl
R=straight chain or branched alkyls having 1 to 12 carbons,

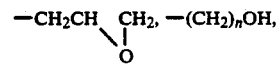

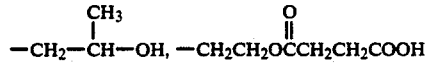

and H
n=2 to 7.

In the case of hydroxy-substituted alkyl acrylates the monomers may include members selected from the group consisting of the following esters of acrylic or methacrylic acid and aliphatic glycols: 2-hydroxy ethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethylene-glycol acrylate; 5-hydroxypentyl acrylate; 6-hydroxyhexyl acrylate; triethyleneglycol acrylate; 7-hydroxyheptyl acrylate; 2-hydroxy-1-methylethyl methacrylate; 2-hydroxy-propyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; and 7-hydroxyheptyl methacrylate.

"Polyester" or "polyester polymer" means the polymerized reaction product of polyacids and polyols;

polyacids include diacids such as isophthalic, terephthalic, and fumaric acids and $HOOC(CH_2)_nCOOH$ where n =2 or more and "dimer acids", anhydrides of diacids such as maleic, phthalic, hexahydrophthalic, and succinic, and anhydrides of polyacids such as trimellitic acid anhydride. The polyols which react to form the main chain of the polyester include linear diols such as $HO(CH_2)_mOH$ where m=2 or more, branched aliphatic diols such as neopentyl glycol, 1,3-butylene glycol, propylene glycol and 1,3-dihydroxy-2,2,4-trimethylpentane, cycloaliphatic diols such as hydroquinone, 1,4-dihydroxymethyl-cyclohexane and "hydrogenated bisphenol A", diol ethers such as diethylene glycol, triethylene glycol and dipropylene glycol, and polyols such as glycerol, pentaerythritol, trimethylol propane, trimethylol ethane, dipentaerythritol, sorbitol and styrene-allyl alcohol copolymers.

In this invention "alkyd polymers" are considered to be a sub-class of "polyester polymers". Alkyds are condensation polymers of the polyacids and polyols as described above that also contain monobasic acids. The monobasic acids may include saturated or unsaturated fatty acids having between 9 and 26 carbon atoms and monobasic aromatic acids.

Fatty, or other carboxylic, acids that are used to prepare alkyd resins include $HOOC(CH_2)_nCH_3$ where n = 7 to 22, oleic acid, linoleic acid, linolenic acid, erucic acid, soybean oil fatty acids, linseed oil fatty acids, safflower oil fatty acids, sunflower oil fatty acids, coconut oil fatty acids, tall oil fatty acids, dehydrated castor oil fatty acids, benzoic acid, toluic acid and t-butylbenzoic acid. Fatty acids may be incorporated into the alkyd polymer as such or as a component of triglycerides.

"Polyurethane polymer" means a polymer containing the group $$-\underset{\underset{H}{|}}{N}-\underset{\underset{O}{\|}}{C}-O-$$

as a repeating group typically formed through a polymerization reaction of a polyisocyanate and a polyol.

"Cross flow filtration" means that the product flow and the feed flow are approximately perpendicular. In dead end filtration, the product and feed flows are co-current.

"Porous ceramic filter" means a porous filter made from a clay, which clay includes aluminum, silicon and water, zirconia, silica, titania and other coatings including carbon and glass, such as the filters described in U.S. Pat. No. 4,069,157 to Hoover et.al. which is incorporated as if fully written herein.

"Nonmetallic inorganic filter" includes ceramic filters and means a porous filter made from sintered metal oxides and hydroxides including sintered alumina, sintered ceramics, and microporous glass such as those described in U.S. Pat. Nos. 4,562,021, 4,724,078, 4,698,157 and 4,946,592 which are incorporated as if fully written herein.

"Nonaqueous media" means a media which does not have more than about 0.1 weight percent water.

"Nonaqueous dispersion" means a dispersion which does not have more than about 0.1 weight percent water.

"Membrane flux" means the amount of permeate dispersion passing through the membrane or filter per unit of time per unit of membrane surface area.

"Transmembrane pressure drop" is defined as the average of the inlet and outlet pressures less the permeate pressure $$\left(\frac{P_1 + P_2}{2} - P_3\right)$$

According to the invention, particulate product dispersed in a nonaqueous media is cross flow filtered through a porous nonmetallic inorganic filter having a pore size in the range of from about 0.5 to about 10 microns and preferably from about 3 to about 6 microns at a cross flow rate in the range of about 3.0 to about 9.0 feet/second (1 to 3 meter/sec) at a temperature of at least about 120° F. and preferably in the range of from about 160° F. to about 200° F.

The particulate product in the dispersion includes particles having a cross section of at least one micron to about 200 microns although other larger particles which may be impurities may be in the dispersion. The particulate product and nonaqueous media form a nonaqueous dispersion or suspension having a viscosity in the range of from about 10 cps to about 500 cps at about 140° F. The minimum temperature at which the cross flow filtration is conducted is about 120° F. According to the method, the dispersion passes through the filter at a rate of about 1.4 to about 7.0 gal/hr/ft$^2$ or about 57 to about 284 liter/hr/m$^2$ of filter surface area. The transmembrane pressure drop across the filter is in the range of from about 10 psig to about 60 psig. Further, the method may include backflushing with the nonaqueous media. There should be a backflush of about 2 to about 5 seconds for about every 3 to about 5 minutes of cross-flow filtration.

In the aspect of the invention directed to polymeric dispersions, the insoluble particulate polymers are separated from soluble polymer solution. The invention permits the separation of particles from the polymer solution at elevated temperatures, in dispersions having high viscosities and in otherwise more hostile conditions previously used in connection with nonmetallic inorganic filters and polymeric dispersions. The invention permits effective filtration of the polymeric dispersion of high solids levels with low levels of VOC emissions. The process permits recovery of at least 95 weight percent of the product in the recovered dispersion. Elimination of DE and filter papers eliminates or reduces waste, environmental disposal problems and reduces resin manufacturing costs.

In the aspect of the invention directed at the filtration of dispersions of polymeric resins, alkyds will have a number average molecular weight in the range of from about 1,500 to about 10,000, and the alkyd dispersion used in the inventions will have solids or gels in a level of from about 0.02 to about 1.0 weight percent based upon the weight of the dispersion. Polyesters other than alkyds will have a number average molecular weight in the range of from about 1,500 to about 10,000 and dispersions of these polyesters used in the invention have a solids level of from about 0.02 to about 1.0 weight percent. Polyurethanes will have a number average molecular weight in the range of from about 1,500 to about 10,000 and a solids level of from about 0.02 to about 1.0 weight percent.

Referring to FIG. 1 and the aspect of the invention directed to the filtration of dispersions of polymeric resins, an alkyd resin having a molecular weight of about 1,500 to about 10,000 dispersed in solvents such as xylene is fed from line 2 into feed resin tank 4. The dispersion has an insoluble solids level of about 0.02 to about 1.0 weight percent based upon the total weight of the dispersion and soluble solids including the alkyd resin in a range of about 40 to about 100%.

The dispersion which is heated to about 165° F. and which has a viscosity of 250 cps, is pumped through line 6 from the feed tank by pump 8 to membrane module 10 through module feed line 12. The dispersion is pumped into the module at about 30 psig at about 165° F. The membrane module has a ceramic filter 14. The ceramic filter has a pore size of about 5 microns. The ceramic filter is commercially available as Membralox Ceramic Filter from United States Filter Corporation, Palm Desert, Calif. During normal filtering, valve 16 to product line 18 is open, valve 20 to recycle line 22 is closed and backflush valve 24 is closed. Valve 26 controls the transmembrane pressure drop in the membrane module. The transmembrane pressure drop, as defined above, is about 20 psig. The membrane flux is about 105 liter/hr/m$^2$ or about 2.6 gal/hr/ft$^2$ for the membrane with a 5 micron pore size. The cross flow rate of the dispersion to the filter is 6 feet/second. The backflush valve 24 and line 28 may be combined with product line 18 and valve 16. During normal filtering operation, the filtrate or permeate (filtered resin) is collected through product line 16 and the retentate or concentrate is fed back through into the feed tank through line 22.

In a second or backflush mode valves 20 and 24 are open and valve 16 is closed, and pump 30 pushes resinous filtrate or solvent back through the filter from the permeate side of the filter to the inside or concentrated side of the filter to sweep the particulates off the filter surface at a pressure of about 80 psig.

The filter should be cleaned periodically to maintain or regenerate its original flux capability. Using alkyd polymers, the cleaning agent may be xylene, aqueous solutions of sodium hydroxide having from about 2 to about 5 weight percent sodium hydroxide and water, with a cleaning by xylene followed by cleaning with a solution of sodium hydroxide (e.g. 5% solution) being preferred. The cleaning agent is run through the filter for a time and temperature effective for cleaning the filter such that the filter or membrane is returned to a condition of about its original membrane flux rate. In this connection a ceramic filter used to filter insoluble solids in a dispersion of an alkyd having a number average molecular weight of about 1,500 to about 10,000 and having about 0.2 to about 1.0 weight percent solids may be cleaned with a 5% NaOH solution at about 150° to about 200° F. and/or xylene over about one half hour to about 2 hours. Preferably the membrane is first flushed with xylene for about 5 to about 10 minutes and then cleaned with the sodium hydroxide by circulating the sodium hydroxide through the membrane for about 2 hours. After cleaning, a water rinsing for 30 minutes follows. After water rinsing, a solvent such as xylene or ethanol should be run through the membrane to remove water from it. The presence of water interferes with the effectiveness of the process.

The following examples set forth aspects of the invention as well as a comparison of the invention as to similar processes.

EXAMPLE I

According to the invention, an alkyd having a number average molecular weight of about 5,000 dispersed in naphtha is circulated through a ceramic membrane, Membralox 1-TI-70 from United States Filter Corporation, Palm Desert, Calif. The alkyd dispersion is 60 weight percent soluble solids. The filtration is done at 175° F. with a 10 psig transmembrane pressure drop for two membranes—one having a 1.4 micron pore size and one having a 5 micron pore size.

The starting flux is 0.19 gal/hr/ft$^2$ (8 liter/hr/m$^2$) for the 1.4 micron membrane and is 2.6 and 105 liter/hr/m$^2$) for 5 micron membrane. The percent flux declines are similar for both membranes at the end of 35 minutes, i.e. 50%. The quality of permeate (clear resin) is the same for both 1.4 and 5.0 micron membrane. The 5 micron pore size is better because it produces higher flux rates while still maintaining good resin quality.

EXAMPLE II

The effectiveness of backflushing is tested using the same resin described in Example I and the same membrane with the 5 micron pore size. The operating temperature is 170° F. and the transmembrane pressure is 10 psig.

Backflushing is done every five minutes for a duration of 5 seconds. At a backflush pressure of 80 psig, the membrane flux improved significantly. The flux decline is reduced 75% by the end of 5 hours, compared to 93% decline without backflush. The average flux is 2.9 gal/hr/ft$^2$ or 118 liters/hr/m$^2$ over a 5 hour period without backflush.

Although the invention has been described with regard to its preferred embodiments, it should be understood that various changes and modifications as would be obvious to one having the ordinary skill in this art may be made without departing from the scope of the invention which is set forth in the claims appended hereto.

The various features of this invention which are believed new are set forth in the following claims.

What is claimed is:

1. A method of littering a nonaqueous dispersion of a polymer selected from the group consisting of an alkyd polymer selected rom the group consisting of an alkyd polymer, a urethane polymer, a polyester polymer and mixtures thereof, the method comprising cross flow filtering at a cross flow rate in the range of from about 3.0 to 9.0 feet per second through a porous nonmetallic inorganic filter having a pore size in the range of from about 0.5 to about 10 microns, at a temperature in the range of from about 120° F. to about 200° F., the dispersion having a viscosity in e range of from about 10 cps to about 500 cps at about 140° F., the dispersion comprising particulates of the polymer having a size n the range of from bout one micron to about 200 microns, the method providing a recovery in a filtrate of at least about 95 weight percent of the polymer based upon the weight of the polymer dispersion flowing to the ceramic filter.

2. A method as recited in claim 1 wherein the filter is a ceramic filter.

3. A method as cited in claim 2 wherein the polymer is an alkyd polymer having a number average molecular weight in the range of from about 1,500 to about 10,000 and the media for the dispersion is a solvent selected from the group consisting of xylene, methyl isobutyl ketone, ethylene glycol monobutyl ether, ethyl 3-ethoxypropionate, Rule 66 exempt mineral spirits, propylene glycol monomethyl ether acetate, propylene glycol monomethyl ether, isobutyl alcohol, normal butyl alcohol, secondary butyl alcohol, normal butyl acetate, methyl amyl ketone, methyl isoamyl ketone, high flash aromatic naphtha, odorless mineral spirits, methyl propyl ketone, porpylene glycol monobutyl ether, triethylamine, 2-ehtyl hexyl acrylate, 1,6-hexanediol diacrylate, isobutyl methyl acrylamide, 2-(2-ethoxy, ethoxy) ethyl acrylate, isobornyl arylate and tripropylene glycol diacrylate.

4. A method as recited in claim 2 or 3 wherein the angle of the flow of the dispersion to the flow of permeate to approximately 90° c.

5. A method as recited in claim 4 wherein the dispersion has an insoluble solids level of not more than about 1 weight percent based upon the weight of the dispersion.

6. A method as recited in claims 2 or 3 wherein the filtrate passes through the ceramic filter at a rate in the range of from about 15 to about 75 gallons/hour/square meter of the filter surface area exposed to the cross flow.

7. A method as recited in claim 2 or 3 wherein the method further comprises at least one back flush of the filer for a time in a range of from about 2 to about 5 seconds for every period of cross flow filtration of from bout 3 to about 5 minutes.

8. A method as recited in claims 2 or 3 wherein the dispersion has an insoluble solids level of not more than about 1 weight percent based upon the weight of the dispersion.

9. A method as recited in claim 1 wherein the dispersion has an insoluble solids level of not more than about 1 weight percent based upon the weight of the dispersion.

10. A method as recited in claim 6 wherein the dispersion has an insoluble solids level of not more than about 1 weight percent based upon the weight of the dispersion.

11. A method as recited in claim 6 wherein the dispersion has an insoluble solids level of not more than about 1 weight percent based upon the weight of the dispersion.

* * * * *

UNITED STATES PATENT AND TRADEMARK OFFICE
CERTIFICATE OF CORRECTION

PATENT NO. : 5,252,218
DATED : October 12, 1993
INVENTOR(S) : Muraldihara et al.

It is certified that error appears in the above-indentified patent and that said Letters Patent is hereby corrected as shown below:

Column 2, line 55, after "diacrylate," insert --isobutyl methyl acrylamide, 2-(2-ethoxy, ethoxy) ethyl acrylate,--.

Column 8, line 44, change "littering" to --filtering--.

Column 8, line 46-47, delete "selected from the group consisting of an alkyd polymer".

Column 8, line 54, change "e" to --the--.

Column 8, line 56, change "n" to --in--.

Column 8, line 57, change "bout" to --about--.

Column 9, line 9, change "porpylene" to --propylene--.

Column 9, line 10, change "ehtyl" to --ethyl--.

Column 9, line 12, change "arylate" to --acrylate--.

UNITED STATES PATENT AND TRADEMARK OFFICE
CERTIFICATE OF CORRECTION

PATENT NO. : 5,252,218
DATED : October 12, 1993
INVENTOR(S) : Muraldihara et al.

It is certified that error appears in the above-indentified patent and that said Letters Patent is hereby corrected as shown below:

Column 9, line 16, change "c." to --C.--.

Column 9, line 16, change "to" to --is--.

Column 10, line 3, change "claim" to --claims--.

Column 10, line 5, change "filer" to --filter--.

Column 10, line 7, change "bout" to --about--.

Signed and Sealed this

Fourth Day of July, 1995

Attest:

BRUCE LEHMAN

*Attesting Officer*   *Commissioner of Patents and Trademarks*